No. 665,509. Patented Jan. 8, 1901.
W. L. CHRYSLER & S. C. MILLS.
SEED POTATO CUTTER.
(Application filed Oct. 24, 1900.)
(No Model.)
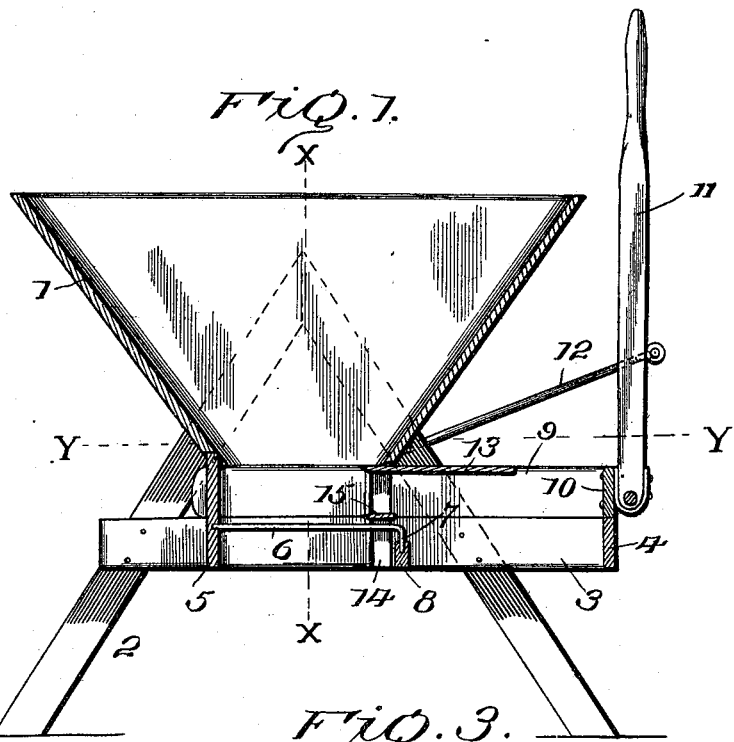
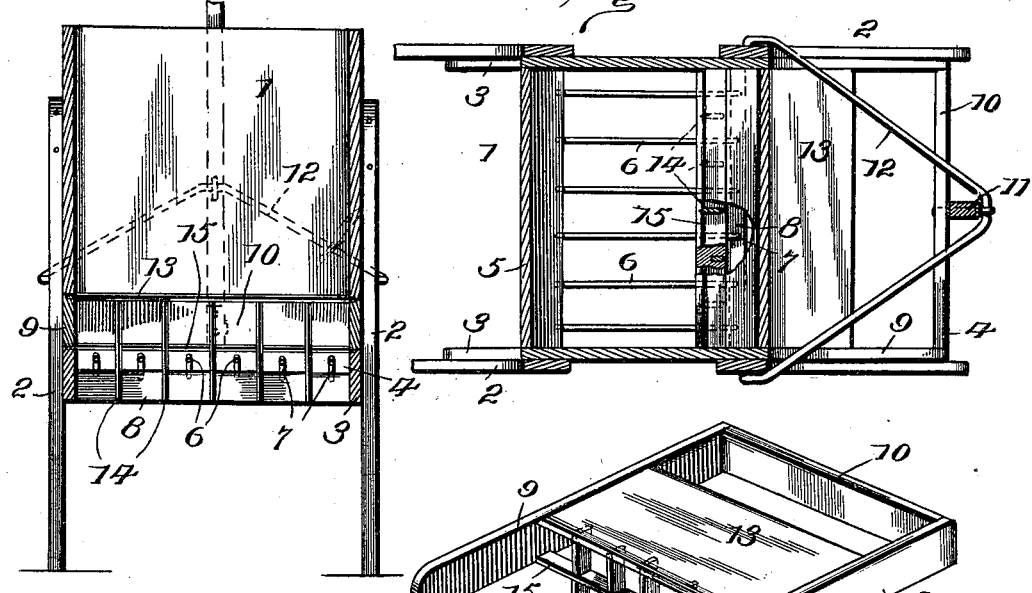
Witnesses
Jno Mirie
Gladys L. Thompson.
Inventors
W. L. Chrysler.
Sanford C. Mills.
By R. S. & A. B. Lacey. Attorneys
THE NORRIS PETERS CO., PHOTO-LITHO., WASHINGTON, D. C.

UNITED STATES PATENT OFFICE.

WILLIAM L. CHRYSLER AND SANFORD C. MILLS, OF WOODBURN, OREGON.

SEED-POTATO CUTTER.

SPECIFICATION forming part of Letters Patent No. 665,509, dated January 8, 1901.

Application filed October 24, 1900. Serial No. 34,187. (No model.)

*To all whom it may concern:*

Be it known that we, WILLIAM L. CHRYSLER and SANFORD C. MILLS, citizens of the United States, residing at Woodburn, in the county of Marion and State of Oregon, have invented certain new and useful Improvements in Seed-Potato Cutters; and we do hereby declare the following to be a full, clear, and exact description of the invention, such as will enable others skilled in the art to which it appertains to make and use the same.

This invention relates to means for cutting potatoes and like tubers into pieces for the purpose of planting, the object being to provide a machine whereby the operation can be quickly, effectively, and easily performed.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a vertical central section of a machine for attaining the objects of this invention. Fig. 2 is a transverse section on the line X X of Fig. 1 looking to the right. Fig. 3 is a plan section on the line Y Y of Fig. 1, the bail being shown in full lines. Fig. 4 is a perspective view of the reciprocating frame carrying the cutting mechanism.

Corresponding and like parts are referred to in the following description and indicated in all the views of the drawings by the same reference characters.

The body of the machine comprises the hopper 1 and side standards 2, attached at their upper ends to opposite sides of the hopper, each standard comprising reversely-inclined bars convergent at their upper ends, as shown most clearly in Fig. 1. A support is located a short distance below the hopper 1 and consists of side bars 3 and a cross-bar 4, the side bars being rigidly attached to the members or bars of the respective standards.
A cross-piece 5 is located about in line with the lower edge of an end piece of the hopper and is supported by the side bars 3 and constitutes a head-block for the cutters to act against when in operation. This head-block 5 is vertically arranged, and one end of a series of horizontal bars 6 is attached thereto, the opposite end of said bars being bent at a right angle, as shown at 7, and let into a cross-piece 8 about in vertical line with the lower edge of the opposite end piece of the hopper. The bars or rods 6 may be spaced apart any distance and constitute a grate to support the potatoes, tubers, or the like contained in the hopper and adapted to be cut up by the machine.

The cutting mechanism is attached to a sliding frame composed of side bars 9 and a transverse connecting-piece 10, the side bars 9 resting upon the side bars 3 of the stationary frame and passing by the ends of the head-block 5, so as not to be obstructed in their reciprocating movements. The reciprocating frame is located below the hopper and in the space formed between the stationary frame and the lower edge of the end pieces of said hopper and is actuated by means of a lever 11, having pivotal connection at its lower end with the cross-piece 10 and fulcrumed between its ends to a swinging bail 12, having its bent terminals let into the adjacent bars of the standards 2. A plate 13 is attached to the top edge of the side bars 9 at a point between their ends and the edge adjacent the hopper sharpened to provide a cutter to sever the potatoes or the like horizontally. Vertical cutters 14 are pendent from the sharpened-edge portion of the plate or horizontal cutter 13 and are spaced apart any required distance. The lower ends of the vertical cutters 14 operate in the spaces formed between the bars or rods 6. A horizontal cutter 15 is located below the cutter 13, with its sharpened edge in vertical line with the cutting edge thereof, and is attached at its ends to the lower edges of the side bars 9. The cutters 13, 14, and 15 inclose spaces of approximately square form and cut the potatoes or tubers into pieces of corresponding shape.

The parts being assembled substantially as shown and it being required to cut potatoes or tubers into pieces or seed, they are placed in bulk in the hopper 1 and are supported by the grate-bottom composed of the bars or rods 6. The frame carrying the cutting mechanism is reciprocated by oscillating the lever 11, and the pieces of the tubers as cut drop through the spaces between the bars 6 upon the floor or ground or are received in a receptacle suitably positioned for their reception. By mounting the operating-lever 11 upon the bail 12 binding between the reciprocating frame and the parts in contact therewith is wholly obviated. The plate 13 or horizontal cutter forms a solid bottom to the hopper when the reciprocating frame is pushed forward, and when said frame is moved outward the cutter is withdrawn and permits other potatoes or tubers to come into position to be cut upon the next forward stroke of the reciprocating frame and cutting mechanism. In the event of the pieces failing to drop below the bars 6 they can be raked off said bars before the return or outstroke of the plate 13, which supports the tubers and prevents the crowding of the seed-pieces. The pieces raked off of the bars 6 drop upon the ground or into a suitably-placed receptacle.

Having thus described the invention, what is claimed as new is—

1. In combination, a bottomless hopper, a grate placed beneath the hopper and spaced therefrom a short distance, a frame mounted to reciprocate in the space between the hopper and grate, upper and lower transverse cutters attached to the said reciprocating frame, the upper cutter operating directly beneath the lower end of the hopper and the lower cutter working directly over the grate, and vertical cutters connecting the upper and lower transverse cutters and having their lower end portions arranged to reciprocate in the spaces formed between the bars of the grate, substantially as described.

2. In combination, a hopper having an open bottom, a supporting-frame located a distance below the hopper, a head-block in line with the lower edge of an end piece of the hopper, a cross-piece in line with the lower edge of the opposite end piece of the hopper, spaced bars constituting a grate and supported by the head-block and cross-piece, and a frame bearing cutting mechanism and mounted to reciprocate beneath the hopper and above the said spaced bars, the side bars of the reciprocating frame clearing the ends of the head-block, substantially as set forth.

3. In combination, a hopper having an open bottom, a frame fixedly mounted a distance below the hopper, a head-block in line with the lower edge of an end piece of the hopper, a cross-piece about in line with the lower edge of the opposite end piece of the hopper, spaced bars constituting a grate and supported at their ends by the head-block and cross-piece, a frame mounted to reciprocate upon the fixed frame, a horizontal plate constituting an upper cutter, a second horizontal cutter spaced from the plate, a series of vertical cutters transversely spaced and having their lower ends operating in the spaces formed between the bars of the grate, an operating-lever having pivotal connection with the reciprocating frame, and a swinging bail forming a support for the operating-lever, substantially as specified.

In testimony whereof we affix our signatures in presence of two witnesses.

WILLIAM L. CHRYSLER. [L. S.]
SANFORD C. MILLS. [L. S.]

Witnesses:
E. P. MORCOM,
A. L. CORNWALL.